72852

G. H. HESS.
WEEDING MACHINE.

PATENTED
DEC 31 1867

Witnesses:
T. Hanely
Jas. R. Hayden

Geo. H. Hess, Inventor
By Jas. B. Gerding
his attorney

United States Patent Office.

GEORGE H. HESS, OF CHICAGO, ILLINOIS.

Letters Patent No. 72,852, dated December 31, 1867.

---

IMPROVEMENT IN WEEDING-MACHINE.

---

The Schedule referred to in these Letters Patent and making part of the same.

---

TO ALL WHOM IT MAY CONCERN:

Be it known that I, GEORGE H. HESS, of the city of Chicago, in the county of Cook, and State of Illinois, have invented a new and useful "Weeding-Machine;" and I do hereby declare that the following is a full and exact description thereof, reference being had to the accompanying drawings, making part of this specification, in which—

Figure 1 is a perspective view of the machine, and

Figure 7:
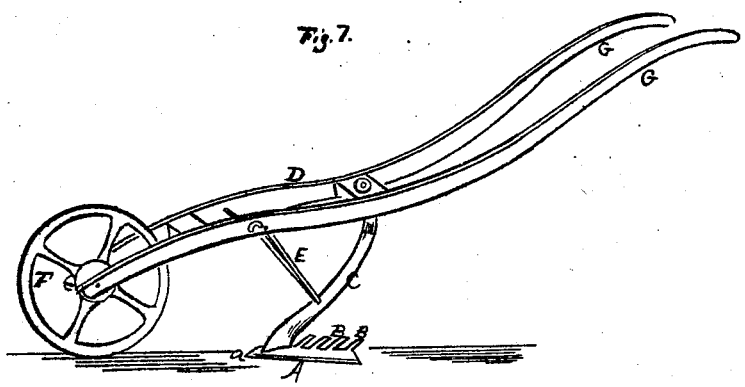
Figure 2:
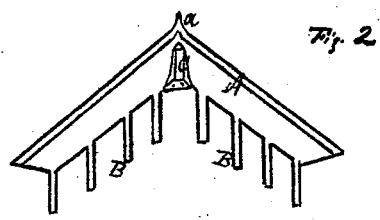
Figure 2 is the plan of the blade.

The nature of my invention consists in an angular steel blade, to act as a weeder, provided with a sharp projecting point, set at the angle of the blade, and fingers placed at and along the rear edge of the blade. Said blade being attached in a proper and substantial manner to a wheel-barrow, thus constitutes a hand-machine for eradicating weeds in gardens and fields, or for clearing paths and walks from weeds.

To enable others skilled in the art to make and use my invention, I will proceed to describe its construction and operation.

A is the weeding-blade, made of steel, $a$ being a projecting slightly bent downward point, to facilitate the entrance of the blade into the ground, and B B are the fingers, placed at and along the back edges of the blades. They are slightly bent upward, for the purpose of sifting the earth and carrying off and depositing the weeds on the top of the stirred soil. C is a standard, to which the blade A is secured, and is in its turn securely fastened to the frame D, and E E are the braces. F is a small wheel, and G G are the handles of the wheel-barrow.

The operation consists in this, that the man operating the weeder pushes before him the wheel-barrow, keeping its wheel just in the middle of the space between two rows of vegetables or drills, and, by raising or lowering his hands, cuts with blade A the weeds at any desirable depth, and, as they are tilted up and carried off by the fingers B B, they are deposited on the top of the stirred soil, and hence wilt and die at once.

The advantages of this machine are several. It cuts shallow or deep, eradicates the weeds effectually, is a simple and cheap labor-saving machine. It can be easily adapted to work with horses, and have several blades attached to the same frame, for the purpose of weeding several spaces between the rows at the same time.

What I claim as my invention, and desire to secure by Letters Patent, is—

The machine, consisting of the inclined blades A, attached to the central standard C, and the latter secured to a hand-frame, having a single wheel at the front and handles at the rear, all constructed and arranged substantially as herein described.

GEO. H. HESS.

Witnesses:
CAL. R. SMYTHE,
H. H. BROWN.